United States Patent
Oyanagi et al.

(10) Patent No.: US 7,968,621 B2
(45) Date of Patent: Jun. 28, 2011

(54) PIGMENT DISPERSED LIQUID, PRODUCTION METHOD FOR THE SAME, AND LIGHT CURABLE INK COMPOSITION USING THE PIGMENT DISPERSED LIQUID

(75) Inventors: Takashi Oyanagi, Shiojiri (JP); Keitaro Nakano, Matsumoto (JP); Chiyoshige Nakazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/639,478

(22) Filed: Dec. 15, 2006

(65) Prior Publication Data

US 2007/0142501 A1 Jun. 21, 2007

(30) Foreign Application Priority Data

Dec. 19, 2005 (JP) ................................. 2005-364315
Dec. 19, 2005 (JP) ................................. 2005-364316
Dec. 19, 2005 (JP) ................................. 2005-364318

(51) Int. Cl.
*C09D 11/00* (2006.01)
*C08G 67/02* (2006.01)

(52) U.S. Cl. .......................... 523/160; 523/161; 524/612

(58) Field of Classification Search .................. 523/160, 523/161; 106/31.27, 31.6; 524/612
See application file for complete search history.

(56) References Cited

U.S. PATENT DOCUMENTS

| | | | | |
|---|---|---|---|---|
| 5,129,948 | A * | 7/1992 | Breton et al. | 106/31.43 |
| 6,433,038 | B1 * | 8/2002 | Tanabe et al. | 522/84 |
| 2002/0083866 | A1 * | 7/2002 | Arita et al. | 106/31.27 |
| 2002/0149659 | A1 | 10/2002 | Wu et al. | |
| 2003/0199612 | A1 * | 10/2003 | Nakajima | 523/160 |
| 2004/0130606 | A1 * | 7/2004 | Tawaraya et al. | 347/100 |
| 2004/0244643 | A1 * | 12/2004 | Voeght et al. | 106/31.49 |
| 2005/0247235 | A1 * | 11/2005 | Voeght et al. | 106/31.27 |
| 2005/0250869 | A1 * | 11/2005 | Claes et al. | 522/71 |
| 2006/0187285 | A1 * | 8/2006 | Oyanagi et al. | 347/100 |
| 2007/0037961 | A1 * | 2/2007 | Oyanagi et al. | 528/310 |
| 2007/0081063 | A1 * | 4/2007 | Nakano et al. | 347/100 |
| 2007/0129457 | A1 * | 6/2007 | Nakano et al. | 522/1 |

FOREIGN PATENT DOCUMENTS

| | | |
|---|---|---|
| EP | 1 674 537 | 6/2006 |
| JP | 05-125309 | 5/1993 |
| JP | 08-041416 | 2/1996 |
| JP | 08-283616 | 10/1996 |
| JP | 2003-105239 | 4/2003 |
| JP | 2003-127518 | 5/2003 |
| JP | 2003-306622 | 10/2003 |
| JP | 2003-311945 | 11/2003 |
| JP | 2005-290035 | 10/2005 |
| WO | 99/29787 | 6/1999 |

OTHER PUBLICATIONS

Nichi Press Release, publication date Oct. 7, 2004, pp. 1-2.*
Klang et al New Developments in Commercialization of UV Curable Inkjet Inks, Sartomer Company, Inc, Exton , PA 2002.*
Patent Abstracts of Japan of JP 2003-127518 dated May 8, 2003.
Patent Abstracts of Japan of JP 2003-306622 dated Oct. 31, 2003.
Patent Abstracts of Japan of JP 2003-105239 dated Apr. 9, 2003.
Patent Abstracts of Japan of JP 2003-311945 dated Nov. 6, 2003.
Patent Abstracts of Japan of JP 2005-290035 dated Oct. 20, 2005.
Patent Abstracts of Japan of JP 05-125309 dated May 21, 1993.
Patent Abstracts of Japan of JP 08-041416 dated Feb. 13, 1996.
Patent Abstracts of Japan of JP 08-283616 dated Oct. 29, 1996.

* cited by examiner

*Primary Examiner* — Basia Ridley
*Assistant Examiner* — Alexander C Kollias
(74) *Attorney, Agent, or Firm* — Ladas & Parry LLP

(57) ABSTRACT

Pigment dispersed liquid contains, at least: a colorant; a dispersant; and a polymerizable compound, the pigment dispersed liquid contain a substantial amount of a polymerization inhibitor.

6 Claims, No Drawings

PIGMENT DISPERSED LIQUID, PRODUCTION METHOD FOR THE SAME, AND LIGHT CURABLE INK COMPOSITION USING THE PIGMENT DISPERSED LIQUID

CROSS-REFERENCES TO RELATED APPLICATIONS

The entire disclosure of Japan Patent Application No. 2005-364315, filed on Nov. 19, 2005, Japan Patent Application No. 2005-364316, filed on Nov. 19, 2005, and Japan Patent Application No. 2005-364318, filed on Nov. 19, 2005, are expressly incorporated herein by reference.

BACKGROUND

1. Technical Field

The invention relates to a pigment dispersed liquid, a production method for the pigment dispersed liquid, and a light curable ink composition using the pigment dispersed liquid; and more particularly to a pigment dispersed liquid in which a monomer does not perform a polymerization during a dispersion treatment even if a polymerization inhibitor or an polymerization-inhibiting organic solvent is not used; a production method for that pigment dispersed liquid and the light curable ink composition containing that pigment dispersed liquid.

2. Related Art

When an inkjet pigment ink composition is prepared, dispersion treatment is generally performed on the pigment by using a disperser so that the pigment is stably dispersed in the ink composition. In a light curable pigment ink composition, a polymerizable compound is used as an ink solvent, but it is very difficult to perform dispersion treatment on both the pigment and the monomer together. The reason for that is that the monomer initiates polymerization in response to heat generated during the dispersion treatment or mechanochemically generated radicals, and that results in undesired phenomena such as increase in viscosity or gelatinization.

There is a method for removing that inconvenience by adding a polymerization inhibitor to control the polymerization of the monomer. For example, JP-A-2003-127518 discloses that ink storage stability, bleed resistance, stability (rubbing resistance etc.) after printing, and smoothness are improved in an ink composition containing 100-10,000 ppm polymerization inhibitor, deformation of a recording medium is controlled, and so a good image can be obtained and a stable and highly detailed image can be printed, irrespective of the type of recording medium (particularly media having no ink absorbability). As another example, JP-A-2003-306622 discloses that an active ray-curable ink containing (a) a pigment dispersed liquid containing 20-95 mass % pigment, (b) a polymerizable compound, (c) a polymerization initiator, and a polymerization inhibitor, the ink having 6-500 mPa·s viscosity at 25° C. and 0.01-2.5 mass % moisture content measured using Karl Fischer method has low viscosity and excellent sensitivity, outgoing stability, heat cycle resistance, and ink storage stability.

However, in the above techniques, the light curable pigment ink composition invariably contains a polymerization inhibitor, which inhibits the curing reaction of the light curable pigment ink composition. Therefore, when the light curable pigment ink composition is prepared, dispersion treatment is generally performed by using an polymerization-inhibiting organic solvent, and a monomer and photopolymerization initiator are added afterward.

Meanwhile, in that method, a drying process before the curing reaction is necessary for removing organic solvent existing in the ink that is not necessary for the curing reaction. Moreover, vaporizing an organic solvent into the air is not favorable in terms of the effect on the work environment, the cost of equipment such as a local exhauster and exhaust gas combustion apparatus, and the surroundings. A method of replacing organic solvent with monomer, e.g. a method in which organic solvent is removed by an evaporator or with a distillation operation, utilizing boiling point difference is also conceivable, but the number of production steps increases, along with the cost, and complete removal of the organic solvent is difficult.

SUMMARY

An advantage of some aspects of the invention is the provision of a pigment dispersed liquid in which a polymerization inhibitor or polymerization-inhibiting organic solvent is not used, and in which a monomer does not cause a polymerization reaction during dispersion treatment; a production method for the pigment dispersed liquid, and a light curable ink composition containing the pigment dispersed liquid.

To achieve the above stated advantage, the invention provides a pigment dispersed liquid that contains, at least a colorant, a dispersant, and a polymerizable compound, and that does not contain a substantial amount of a polymerization inhibitor. Thus the pigment dispersed liquid can be prepared without causing a polymerization reaction of the polymerizable compound (monomer) during dispersion treatment, even though no polymerization inhibitor or polymerization-inhibiting organic solvent is used.

To achieve the above stated advantage, the invention also provides a method for manufacturing a pigment dispersed liquid by mixing, at least, a colorant, a dispersant, and a polymerizable compound to make a mixed solution, and performing dispersion treatment on that mixed solution that does not contain a substantial amount of a polymerization inhibitor. Thus a pigment dispersed liquid can be prepared without causing a polymerization reaction involving the polymerizable compound (monomer) during dispersion treatment, even though no polymerization inhibitor or polymerization-inhibiting organic solvent is used.

To achieve the above stated advantage, the invention also provides a light curable ink composition containing the above described pigment dispersed liquid, a photopolymerization initiator, and a polymerizable compound. Because the light curable ink composition according to an aspect of the invention does not contain a substantial amount of a polymerization inhibitor, the curing reaction involving the light curable ink composition is not inhibited and an image of excellent quality can be formed.

The invention also provides a recording method for performing printing by attaching an ink composition, which is the above described light curable ink composition, to a recording medium, and, after attaching the ink, curing the light curable ink composition by radiating ultraviolet rays. Because the recording method according to an aspect of the invention uses the above described light curable ink composition, curing reaction of the light curable ink composition is not inhibited and an image of excellent quality can be formed. Also, since the pigment dispersed liquid does not contain an organic solvent, the recording method according to an aspect of the invention is advantageous in terms of cost because a drying step is not necessary, and neither is discharge treatment equipment. The effect on the work environment and ambient environment can also be controlled.

The invention also provides an inkjet recording method for performing printing by discharging droplets of an ink composition, which is the above described light curable ink composition, and attaching the droplets to a recording medium, and after that, curing the light curable ink composition by radiating ultraviolet rays. Because the above described light curable ink composition is used in the recording method according to an aspect of the invention, curing reaction of the light curable ink composition is not inhibited and an image of excellent quality can be formed. Moreover, since the pigment dispersed liquid does not contain an organic solvent, the recording method according to an aspect of the invention is advantageous in terms of cost because a drying step is not necessary, and neither is discharge treatment equipment. Effects on the work environment and ambient environment can also be controlled.

Also, the invention provides recorded matter on which printing has been performed by using the above described recording method. Since the printing is performed by using the recording method using the light curable ink composition, an excellent quality image can be formed.

DESCRIPTION OF EXEMPLARY EMBODIMENTS

Pigment Dispersed Liquid

As already described, the pigment dispersed liquid according to an aspect of the invention contains at least a colorant, dispersant, and polymerizable compound, but does not contain a substantial amount of a polymerization inhibitor.

"Not contain a substantial amount of a polymerization inhibitor" means that a polymerization inhibitor is not positively added, or that even if a polymerization inhibitor derived from an ingredient is contained, its content in the pigment dispersed liquid is less than 0.01 weight %. The reason for that number is that if the light curable pigment ink composition is prepared by using a pigment dispersed liquid containing a polymerization inhibitor of 0.01 weight % or more, curing reaction of the light curable pigment ink composition may be inhibited. The "polymerization inhibitor" means one that is contained in general polymerizable compositions. More specific examples of a polymerization inhibitor include phenolic antioxidant, hindered amine light stabilizer, phosphorous antioxidant, hydroquinone monomethylether widely used for (meta)acryl monomer, hydroquinone, t-butylcatechol, and pyrogallol, etc.

The dispersant used in the pigment dispersed liquid according to the present embodiment is preferably polyoxyalkylene polyalkylene amine or sorbitan ester. Specific examples of polyoxyalkylene polyalkylene amine $(C_2H_4N)_n$—$(PO)_x$-$(EO)_y$—OH (In the formula, n, x, and y respectively mean an integer of 1 or larger, PO means propylene oxide, and EO means ethylene oxide.) include Discole N-503, N-506, N-509, N-512, N-515, N-518, and N-520.

The added amount of dispersant is preferably 0.1-20 mass %, more preferably 0.5-10 mass %.

The polymerizable compound used in the pigment dispersed liquid according to the present embodiment is preferably N-vinylformamide or ethyleneglycol monoallylether (product name: Allyl Glycol). Those polymerizable compounds are copolymerized with other monomers, but it does not cause polymerization by itself. Therefore, the pigment dispersion treatment is performed by using only the above compound as a polymerizable compound, taking advantage of the above described characteristic. By doing so, an increase in the dispersed solvent viscosity caused by polymerization occurring during the dispersion treatment does not occur. As a result, the monomer in the pigment can be dispersed without using a polymerization inhibitor.

It is preferable that the colorant used in the present embodiment is a pigment, in terms of light fastness. Both inorganic and organic pigments may be used. A complex pigment made of resin and metal may also be used.

The inorganic pigment may be: carbon black (C.I. pigment black 7, etc.) such as furnace black, lamp black, acetylene black, or channel black; oxidized iron; and oxidized titanium.

The organic pigment may be: azo pigment such as insoluble azo pigment, condensed azo pigment, azo lake, or chelate azo pigment; polycyclic pigment such as phthalocyanine pigment, perylene/perinone pigment, anthraquinone pigment, quinacridone pigment, dioxane pigment, thioindigo pigment, isoindolinone pigment, or quinophthalone pigment; dye chelates (e.g. basic dye type chelate and acid dye type chelates, etc.); nitro pigments; nitroso pigments; aniline black; and daylight fluorescent pigment. The above pigments may be used alone, or in a combination of two or more types. Any pigment not listed in the color index that is insoluble in the ink composition may also be used.

Carbon black is preferably used as the black pigment. Specific examples of carbon black include: #2300, #900, HCF 88, #33, #40, #45, #52, MA 7, MA 8, MA 100, and #2200B manufactured by Mitsubishi Chemical Corporation; Raven 5750, Raven 5250, Raven 5000, Raven 3500, Raven 1255, and Raven 700 manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation; and Color Black FW1, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 manufactured by Degussa Corporation. The above carbon blacks may be used alone, or a mixture of two can also be used.

The yellow pigment may be C.I. pigment yellows 1, 2, 3, 12, 13, 14, 16, 17, 73, 74, 75, 83, 93, 95, 97, 98, 109, 110, 114, 120, 128, 129, 138, 150, 151, 154, 155, 180 and 185. Preferably, one selected from the group consisting of C.I. pigment yellows 74, 109, 110, 128, and 138, or a mixture of any two of those is used.

The magenta/light magenta pigment may be C.I. pigment red 5, 7, 12, 48 (Ca), 48 (Mn), 57 (Ca), 15:1, 112, 122, 123, 168, 184, 202 or 209, or C.I. pigment violet 19. Preferably, one selected from the group consisting of C.I. pigment reds 122, 202, and 209 and C.I. pigment violet 19, or a mixture of any two of those is used.

The cyan/light cyan pigment may be C.I. pigment blue 1, 2, 3, 15:3, 15:4, 15:34, 16, 22 or 60, or C.I. vat blue 4 or 60. Preferably, one selected from the group consisting of C.I. pigments blues 15:3, 15:4, and 60, or a mixture of any two of those is used.

The pigment used as white ink may be titanium dioxide, calcium carbonate, calcium sulfate, zinc oxide, barium sulfate, barium carbonate, silica, alumina, kaolin, clay, talc, white clay, aluminum hydroxide, magnesium carbonate, or white hollow resin emulsion. Preferably, one selected from the group consisting of them, or a mixture of any two of them is used.

There are no particular limitations on the pigment used as metallic ink. For example, a pigment prepared by peeling and spalling a metal/metal compound layer from a sheet substrate at a boundary between the metal/metal compound layer and a peeling resin layer in a complex pigment raw material formed by sequentially accumulating the peeling resin layers and the metal/metal compound layers one by one on the sheet substrate may be used.

There are no particular limitations on the metal or metal compound used for the metal or metal compound layer in the complex pigment raw material for producing the metallic pigment, so long as it has metallic shine. For example, aluminum, silver, gold, platinum, nickel, chrome, tin, zinc, indium, titanium, copper or similar may be used. Those metals are used as the metal alone, or as part of metal compound, alloyed metal, or mixture.

The average thickness of the metal pigment is preferably 20 nm or more and 100 nm or less, its 50% mean particle diameter is 0.5 μm or more and 3.0 μm or less, and the maximum particle diameter in the particle size distribution is 10 μm or less. The added amount of the metal pigment in the metallic ink composition is preferably between 0.1 and 25 weight %, and more particularly between 0.5 and 15 weight %.

Some of the above listed color pigments can be mixed when used to adjust their color tone. For example, pigment black 7 and pigment blue 15:3 can be mixed in order to change a reddish black color tone to a bluish tone.

The mean particle diameter of the pigment used in the present embodiment is preferably between 10 and 500 nm, and more particularly between 50 and 300 nm. The content of the pigment used in the present embodiment may be decided as appropriate, depending on the type of ink compositions such as a thick/thin ink composition, but is 1.5-20 weight %, and preferably 3-10 weight % in the ink composition.

Pigment Dispersed Liquid Producing Method

The method for producing a pigment dispersed liquid according to an aspect of the invention is, as already described, a method for producing a pigment dispersed liquid by mixing at least a colorant, dispersant, and polymerizable compound to prepare a mixed solution, and performing dispersion treatment on the mixed solution that does not contain a substantial amount of a polymerization inhibitor.

It is preferable that the dispersant used in the pigment dispersed liquid according to the present embodiment is polyoxyalkylene polyalkylene amine or sorbitan ester.

It is preferable that the polymerizable compound used in the pigment dispersed liquid according to the present embodiment is N-vinylformamide or ethyleneglycol monoallylether. Those polymerizable compounds are copolymerized with other monomers, but they do not polymerize by themselves. Therefore, the monomer in the pigment can be dispersed without using a polymerization inhibitor by performing pigment dispersion using only the above compound.

The dispersion treatment can be performed by using a common dispersion method used when preparing a pigment dispersed liquid. For example, a pigment dispersed liquid in which pigment is dispersed in the solvent can be prepared by mixing and stirring at least a colorant, dispersant, and polymerizable compound to prepare a mixed solution, and stirring, at high speed, the mixed solution with zirconia beads by using a sand mill at or below the dispersed solvent temperature of 40° C. for 3-12 hours. After that, the zirconia beads are separated from the pigment dispersed liquid.

In the present embodiment, content explained for the "pigment dispersed liquid," where relevant, also applies to content that is not explained in detail.

Light Curable Ink Composition

The light curable ink composition according to an aspect of the present invention contains the above described pigment dispersed liquid, a photopolymerization initiator, and a polymerizable compound.

As the photopolymerization initiator, the well known photopolymerization initiator described in 39-56 pages in "The Photopolymer Handbook" (edited by the Technical Association of Photosensitive Polymers of Japan, issued by Kogyo Chosakai Publishing, Inc., 1989), or the compounds disclosed in JP-A-64-13142 and JP-A-2-4804 may be used.

There are no particular limitations on what is used for the polymerizable compound, and various kinds of polymerizable compound may be used. Preferably, N-vinylformamide or ethyleneglycol monoallylether (product name: Allyl Glycol) is used.

Also, there are no limitations on what is used as polymerizable compounds, other than N-vinylformamide and ethyleneglycol monoallylether, if the polymerizable compounds are polymerized by radicals or ions generated from a photopolymerization initiator. The polymerizable compound indicates a molecule that can be a constituent unit of the basic structure of high polymers, and is also referred to as a photopolymerizable monomer, which includes a monofunctional monomer, bifunctional monomer, and multifunctional monomer. There are no particular limitation on what is used for the monofunctional monomer, bifunctional monomer, and multifunctional monomer, if they have a molecular weight of 100-3000 (preferably 100-2000).

Typical examples of polymerizable compounds are the monofunctional monomer may be phenoxyethyl acrylate, isobornyl acrylate, methoxy diethylene monoacrylate, acroyl morpholine, lauryl methacrylate, 2-hydroxyethyl methacrylate, cyclohexyl methacrylate, or oxetane methacrylate, etc.

The bifunctional monomer may be ethylene glycol methacrylate, diethylene glycol diacrylate, diethylene glycol dimethacrylate, tripropylene glycol diacrylate, 1,9-nonanediol diacrylate, polyethylene glycol #400 diacrylate, tetraethylene glycol dimethacrylate, 1,6-hexythandiol diacrylate, 1,6-hexythandiol dimethacrylate, neopentyl glycol diacrylate, neopentyl glycol dimethacrylate, 2-hydroxy-1,3-dimethacryloxy propane, hydroxyl piopleline acid ester neopentyl glycol diacrylate, or 1,4-buthandiol dimethacrylate, etc.

The multifunctional monomer may be trimethylol propane triacrylate, trimethylol propane trimethacrylate, trimethylol propane EO adduct triacrylate, trimethylol propane PO adduct triacrylate, glycerin EO adduct triacrylate, glycerin PO adduct triacrylate, pentaerythritol triacrylate, dipentaelithritol hexacrylate, dipentaelithritol polyacrylate, or dendrimer produced by a reaction between multifunctional monomers.

Other polymerization accelerators can be added to the light curable ink composition according to the present embodiment. The polymerization accelerator may be one made of amine compounds. Although the amine compounds are not limited, amino benzoate derivatives are preferably used in terms of smell and ink composition curing certainty. The reason for that is that the amino benzoate derivatives reduce polymerization inhibition caused by oxygen.

It is preferable that the amino benzoate derivatives do not have absorption of a 350 nm or larger wavelength band. There are no limitations on what is used for such amino benzoate derivatives, but examples include ethyl-4-dimethyl amino benzoate, and 2-ethylhexyl-4-dimethylamino benzoate. For those particular amino benzoate derivatives, DAROCUR EDB and EHA (manufactured by Ciba Specialty Chemicals) are available.

An example of the photopolymerization initiator contained in the light curable ink composition in the present embodiment is one that initiates polymerization of the polymerizable compound by absorbing ultraviolet rays or visible light in the range of 200-450 nm and generating radicals or ions.

Typical examples of radicals generated by the photopolymerization initiator used in the light curable ink composition according to the present embodiment include: benzoin methyl ether, benzoin ethyl ether, isopropyl benzoin ether, isobutyl benzoin ether, 1-phenyl-1,2-propanedion-2-(o-ethoxycarbonyl)oxime, benzyl, diethoxy acetophenone, benzophenone, chlorothioxanthone, 2-chlorothioxanthone, isopropylthioxanthone, 2-methylthioxanthone, polychlorinated polyphenyl, and hexachlorobenzene. Preferably, isobutyl benzoin ether, or 1-phenyl-1,2-propanedion-2-(o-ethoxycarbonyl)oxime is used.

Commercially available photopolymerization initiators—product name VICURE 10, 30 (manufactured by Stauffer Chemicals Co.); Irgacure 184, 127, 500, 651, 2959, 907, 369, 379, 754, 1700, 1800, 1850, 1870, and 819m OXE 01. Darocur 1173, TPO, and ITX (manufactured by Ciba Specialty Chemicals); Quantacure CTX and ITX (Aceto Chemical Co., Inc.), Kayacure DETX-S (manufactured by Nippon Kayaku Co., Ltd.); ESACURE KIP 150 (manufactured by Lamberti s.p.a.); and Lucirin TPO (manufactured by BASF Japan Ltd.)—are also available.

The light curable ink composition according to the present embodiment may contain aqueous solvent, and may also contain, as arbitrary constituents, resin emulsion, inorganic oxide colloid, humectant, pH adjuster, preservatives, fungicides thermopolymerization inhibitor, and surfactant.

Recording Method

The recording method according to the present embodiment is a recording method using the above described light curable ink composition. The recording method using a light curable ink composition is designed to attach the light curable ink composition by using, e.g., an inkjet recording method, a recording method using writing instruments such as a pen, or other various printing method(s), and then curing the ink composition by radiating ultraviolet rays. Accordingly, the light curable ink composition according to the present embodiment is suitable for use in writing instruments such as an water-based pen, an inkjet recording method, printing, or stamping.

According to another embodiment of the recording method, an inkjet recording method of discharging droplets of the above described ink composition, attaching the ink droplets to a recording medium, and then curing the ink droplets by radiating ultraviolet rays is provided. As the inkjet recording method according to this embodiment, any method of discharging droplets of the above described ink compositions from minute nozzles and attaching the ink droplets to a recording medium may be used. Various kinds of methods are known as examples of that kind of method.

An example of the method is an electrostatic suction type method. In this type, an intense electric field is applied between nozzles, an acceleration electrode is arranged in front of the nozzles, an ink composition is continuously jetted in droplet form from the nozzles, and recording is performed by supplying a print information signal to deflection electrodes while the ink droplets are jetting between the deflection electrodes. If necessary, ink droplets may be jetted according to a print information signal, without deflecting the ink droplets.

The method according to still another embodiment is a method of forcing ink droplets to be jetted by applying pressure to ink liquid by using a small pump and mechanically vibrating nozzles by using a crystal oscillator or similar. In this method, the jetted ink droplets are charged when being jetted, and recording is performed by supplying a print information signal to deflection electrodes while the ink droplets are jetting between the deflection electrodes. In a method according to still another embodiment, a piezoelectric element is used. In that method, pressure is applied and a print information signal is supplied to ink liquid at the same time by the piezoelectric element, so that ink droplets are jetted and recording is performed. In a method according to still another embodiment, the volume of ink liquid is rapidly expanded by the action of thermal energy. In that method, ink droplets are jetted by heating and foaming ink liquid according to a print information signal by using a minute electrode, and then recording is performed.

There is no particular limitation on what is used for the recording medium, and various recording mediums such as normal paper, inkjet paper (mat/glossy paper), glass, plastic, film, metal, and printed circuit board may be used.

It is preferable that a suitable dosage of ultraviolet ray radiation is selected as appropriate, depending on the amount or thickness of the ink composition attached to a board or recording medium. The ultraviolet ray radiation dosage cannot be strictly specified, but is preferably 10 mJ/cm$^2$ or more and 10,000 mJ/cm$^2$ or less, and more preferably 50 mJ/cm$^2$ or more and 6,000 mJ/cm$^2$ or less. If the radiated ultraviolet ray dosage is in that range, it causes sufficient curing.

The ultraviolet ray radiation is provided by using a lamp such as a metal halide lamp, xenon lamp, carbon arc lamp, low pressure mercury lamp, or high pressure mercury lamp. For example, the ultraviolet ray radiation can be provided by using a commercial lamp such as an H lamp, D lamp, V lamp or similar, manufactured by Fusion System.

From the viewpoint of a reduction in energy consumption, it is particularly preferable that the ultraviolet ray radiation is performed by using an ultraviolet light emitting semiconductor device, such as an ultraviolet light emitting diode (ultraviolet LED) or an ultraviolet light emitting semiconductor laser.

In the recording method using the ink composition according to the present embodiment, the recording medium maybe heated before, or at the same time as ultraviolet ray radiation. The heating method may be a method of heating the recording medium by bringing a heat source into contact with the recording medium, or a method of heating the recording medium by radiating infrared rays or microwaves (e.g. electromagnetic waves having a maximal wavelength of around 2,450 MHz), or by blowing hot air on to the recording medium.

Recorded Matter

According to the present embodiment, recorded matter recorded with the recording method according to the above described embodiment is also provided. That recorded matter is obtained by discharging droplets of at least the above described light curable ink composition, and attaching the droplets to a recording medium to perform recording. Because the above described light curable ink composition is used in the recorded matter recorded with the recording method according to the present embodiment, it has excellent quick dry properties and durability. As specific examples of the recording medium, the above listed recording mediums may be used.

EXAMPLES

1. Preparation of the Pigment Dispersed Liquid

Pigment Dispersed Liquid 1

15 Parts by weight of C.I. Pigment Black 7 (carbon black) as a colorant, 3.5 parts by weight of DISCOLE N-518 (manufactured by Dainichiseika Color and Chemicals Mfg. Co., Ltd.) as a dispersant, and N-vinylformamide (manufactured by Arakawa Chemical Industries, Ltd; hereinafter abbreviated as "NVF") as a monomer were added to form 100 parts by weight, and were mixed and stirred to make a mixed solution. Dispersion treatment was performed on the mixed solution with zirconia beads (1.5 mm diameter) using a sand mill (manufactured by Yasukawa Seisaksho) for six hours. After that, the zirconia beads were removed using a separator and pigment dispersed liquid 1 was obtained. The initial viscosity of pigment dispersed liquid 1 was measured by an MCR-300 manufactured by Physica, and the result was 10.1 (mPa·s).

Pigment Dispersed Liquid 2

Pigment dispersed liquid 2 was obtained in the same way as pigment dispersed liquid 1, except that the colorant was C.I. pigment yellow 155 and the added content of Discole N-518 was 1.0 parts by weight. The initial viscosity of pigment dispersed liquid 2 was measured by an MRC-300 manufactured by Physica, and the result was 6.4 (mPa·s).

Pigment Dispersed Liquid 3

Pigment dispersed solvent 3 was obtained in the same way as pigment dispersed liquid 1, except that the colorant was C.I. Pigment Violet 19 and the added amount of Discole N-518 was 1.0 parts by weight. The initial viscosity of the pigment dispersed liquid 3 was measured by an MCR-300 manufactured by Physica, and the result was 7.4 (mPa·s).

Pigment Dispersed Liquid 4

Pigment dispersed liquid 4 was obtained in the same way as pigment dispersed liquid 1, except that the colorant was C.I. Pigment Blue 15:3 and the added amount of Discole N-518 was 2.0 parts by weight. The initial viscosity of the pigment dispersed liquid 4 was measured by an MCR-300 manufactured by Physica, and the result was 5.9 (mPa·s).

Pigment Dispersed Liquid 5

15 parts by weight of C.I. Pigment Black 7 (carbon black) as a colorant, 3.5 parts by weight of Discloe N-509 (manufactured by Dainichiseika Color and Chemicals Mfg. Co., Ltd.) as a dispersant, and Allyl Glycol (product name; manufactured by Nippon Nyukazai Co., Ltd.; hereinafter abbreviated as "AG") as a polymerizable compound (monomer) were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed using a separator, and pigment dispersed liquid 5 was obtained. The initial viscosity of pigment dispersed liquid 5 was measured by an MCR-300 manufactured by Physica, and the result was 8.8 (mPa·s).

Pigment Dispersed Liquid 6

Pigment dispersed liquid 6 was obtained in the same way as pigment dispersed liquid 5, except that the colorant was C.I. Pigment Yellow 155. The initial viscosity of pigment dispersed liquid 6 was measured by an MCR-300 manufactured by Physica, and the result was 7.6 (mPa·s).

Pigment Dispersed Liquid 7

Pigment dispersed liquid 7 was obtained in the same way as pigment dispersed liquid 5, except that the colorant was C.I. Pigment Violet 19. The initial viscosity of pigment dispersed liquid 7 was measured by an MCR-300 manufactured by Physica, and the result was 6.2 (mPa·s).

Pigment Dispersed Liquid 8

Pigment dispersed liquid 8 was obtained in the same way as pigment dispersed liquid 5, except that the colorant was C.I. Pigment Blue 15:3. The initial viscosity of pigment dispersed liquid 8 was measured by an MCR-300 manufactured by Physica, and the result was 7.2 (mPa·s).

Pigment Dispersed Liquid 9

15 parts by weight of C.I. Pigment Black 7 (carbon black) as a colorant, 3.5 parts by weight of styrene-acrylic acid copolymer ammonium salt (10,000 average molecular weight), and AG were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho). However, the obtained pigment dispersed liquid 9 gelatinized after a lapse of an hour the start of dispersion, and so the beads could not be separated. Therefore, the initial viscosity of pigment dispersed liquid 9 could not be measured.

Pigment Dispersed Liquid 10

15 parts by weight of C.I. Pigment Black 7 (carbon black) as a colorant, 3.5 parts by weight of DISCOLE N-509 as a dispersant, 0.2 parts by weight of p-methoxyphenol (manufactured by Kanto Chemical Co., Inc.) and AG were added to form 100 parts, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed and pigment dispersed liquid 10 was obtained. The initial viscosity of the pigment dispersed liquid 10 was measured by an MCR-300 manufactured by Physica, and the result was 8.8 (mPa·s).

Pigment Dispersed Liquid 11

Pigment dispersed liquid 11 was obtained in the same way as pigment dispersed liquid 10, except that the colorant was C.I. Pigment Yellow 155. The initial viscosity of pigment dispersed liquid 11 was measured by an MCR-300 manufactured by Physica, and the result was 7.6 (mPa·s).

Pigment Dispersed Liquid 12

Pigment dispersed liquid 12 was obtained in the same way as pigment dispersed liquid 10, except that the colorant was C.I. Pigment Violet 19. The initial viscosity of pigment dispersed liquid 12 was measured by an MCR-300 manufactured by Physica, and the result was 6.4 (mPa·s).

Pigment Dispersed Liquid 13

Pigment dispersed liquid 13 was obtained in the same way as pigment dispersed liquid 10, except that the colorant was C.I. Pigment Blue 15:3. The initial viscosity of pigment dispersed liquid 13 was measured by an MCR-300 manufactured by Physica, and the result was 7.3 (mPa·s).

Pigment Dispersed Liquid 14

15 parts by weight of C.I. Pigment Black 7 (carbon black) as a colorant, 3.5 parts by weight of styrene-acrylic acid copolymer ammonium salt (10,000 average molecular weight) as a dispersant, 0.2 parts by weight of p-methoxyphenol as a thermopolymerization inhibitor, and AG as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for two hours. After that, the zirconia beads were removed by a separator and pigment dispersed liquid 14 was obtained. The initial viscosity of pigment dispersed liquid 14 was measured by an MCR-300 manufactured by Physica, and the result was 35.2 (mPa·s).

Pigment Dispersed Liquid 15

15 parts by weight of C.I. Pigment Black 7 (carbon black) as a colorant, 3.5 parts by weight of Discole N-509 as a dispersant, 0.2 parts by weight of p-methoxyphenol as a thermopolymerization inhibitor, and NVF as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 15 was obtained. The initial viscosity of pigment dispersed liquid 15 was measured by an MCR-300 manufactured by Physica, and the result was 11.3 (mPa·s).

Pigment Dispersed Liquid 24

15 parts by weight of C.I. Pigment Black 7 (carbon black) as a colorant, 3.5 parts by weight of Discole N-509 (manufactured by Dainichiseika Color and Chemicals Mfg. Co., Ltd), and Allyl Glycol (manufactured by Nippon Nyukazai Co., Ltd.; hereinafter abbreviated as "AG") as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 24 was obtained. The initial viscosity of pigment dispersed liquid 24 was measured by an MCR-300 manufactured by Physica, and the result was 8.8 (mPa·s).

Pigment Dispersed Liquid 25

Pigment dispersed liquid 25 was obtained in the same way as pigment dispersed liquid 16, except that the colorant was C.I. Pigment Yellow 155. The initial viscosity of pigment dispersed liquid 25 was measured by an MCR-300 manufactured by Physica, and the result was 7.6 (mPa·s).

Pigment Dispersed Liquid 26

Pigment dispersed liquid 26 was obtained in the same way as pigment dispersed liquid 16, except that the colorant was C.I. Pigment Violet 19. The initial viscosity of pigment dispersed liquid 26 was measured by an MCR-300 manufactured by Physica, and the result was 6.2 (mPa·s).

Pigment Dispersed Liquid 27

Pigment dispersed liquid 27 was obtained in the same way as pigment dispersed liquid 16, except that the colorant was C.I. Pigment Blue 15:3. The initial viscosity of pigment dispersed liquid 27 was measured by an MCR-300 manufactured by Physica, and the result was 7.2 (mPa·s).

Pigment Dispersed Liquid 28

15 parts by weight of C.I. Pigment Black 7 (carbon black) as a colorant, 2.0 parts by weight of sorbitan monolaurate (manufactured by Wako Pure Chemical Industries, Ltd.) as a dispersant, and AG were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 28 was obtained. The initial viscosity of pigment dispersed liquid 28 was measured by an MCR-300 manufactured by Physica, and the result was 5.9 (mPa·s).

Pigment Dispersed Liquid 29

15 parts by weight of C.I. Pigment Black 7 (carbon black) as a colorant, 3.5 parts by weight of Discole N-509 (manufactured by Dainichiseika Color and Chemicals Mfg. Co., Ltd) as a dispersant, and lauryl methacrylate (manufactured by Mitsubishi Gas Chemical Company Inc.) as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho). However, the obtained pigment dispersed liquid 29 gelatinized after a lapse of an hour from the start of dispersion, and so the beads could not be separated. Therefore, the initial viscosity of pigment dispersed liquid 29 could not be measured.

Pigment Dispersed Liquid 30

15 parts by weight of C.I. Pigment Black 7 (carbon black) as a colorant, 3.5 parts by weight of Discole N-509 (manufactured by Dainishiseika Color and Chemicals Mfg., Co., Ltd.) as a dispersant, 0.5 parts by weight of p-methoxyphenol (manufactured by Kanto Chemical Co., Inc.) as a thermopolymerization inhibitor, and lauryl methacrylate (manufactured by Mitsubishi Gas Chemical Company, Inc.) as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 30 was obtained. The initial viscosity of pigment dispersed liquid 30 was measured by an MCR-300 manufactured by Physica, and the result was 21.6 (mPa·s).

Pigment Dispersed Liquid 31

15 parts by weight of C.I. Pigment Black 7 (carbon black) as a colorant, 3.5 parts by weight of Discole N-509 as a dispersant, 0.2 parts by weight of p-methoxyphenol as a thermopolymerization inhibitor, and AG were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 31 was obtained. The initial viscosity of pigment dispersed liquid 31 was measured by an MCR-300 manufactured by Physica, and the result was 9.0 (mPa·s).

Pigment Dispersed Liquid 16

15 parts by weight of C.I. Pigment Black 7 (carbon black) as a colorant, 3.5 parts by weight of Discole N-518 (manufactured by Dainishiseika Color and Chemicals Mfg., Co., Ltd.) as a dispersant, and N-vinylformamide (manufactured by Arakawa Chemical Industries, Ltd; hereinafter abbreviated as "NVF") were added to form 100 parts, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 16 was obtained. The initial viscosity of pigment dispersed liquid 16 was measured by an MCR-300 manufactured by Physica, and the result was 10.1 (mPa·s).

Pigment Dispersed Liquid 17

Pigment dispersed liquid 25 was obtained in the same way as pigment dispersed liquid 24, except that the colorant was C.I. Pigment Yellow 155 and the added amount of the Discole N-518 was 1.0 parts by weight. The initial viscosity of pigment dispersed liquid 17 was measured by an MCR-300 manufactured by Physica, and the result was 6.4 (mPa·s).

Pigment Dispersed Liquid 26

Pigment dispersed liquid 18 was obtained in the same way as pigment dispersed liquid 24, except that the colorant was C.I. Pigment Violet 19 and the added amount of the Discole N-518 was 1.0 parts by weight. The initial viscosity of pigment dispersed liquid 18 was measured by an MCR-300 manufactured by Physica, and the result was 7.4 (mPa·s).

Pigment Dispersed Liquid 19

Pigment dispersed liquid 19 was obtained in the same way as pigment dispersed liquid 24, except that the colorant was C.I. Pigment Blue 15:3 and the added amount of the Discole N-518 was 2.0 parts by weight. The initial viscosity of pigment dispersed liquid 19 was measured by an MCR-300 manufactured by Physica, and the result was 5.9 (mPa·s).

Pigment Dispersed Liquid 20

15 parts by weight of C.I. Pigment Black 7 (carbon black) as a colorant, 2.0 parts by weight of sorbitan monolaurate (manufactured by Wako Pure Chemical Industries, Ltd.) as a dispersant, and NVF were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 20 was obtained. The initial viscosity of pigment dispersed liquid 20 was measured by an MCR-300 manufactured by Physica, and the result was 11.4 (mPa·s).

Pigment Dispersed Liquid 21

15 parts by weight of C.I. Pigment Black 7 (carbon black) as a colorant, 3.5 parts by weight of Discole N-518 (manufactured by Dainishiseika Color and Chemicals Mfg., Co., Ltd.) as a dispersant, and lauryl methacrylate (manufactured by Mitsubishi Gas Chemical Company Inc.) were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho). However, the obtained pigment dispersed liquid 21 gelatinized after a lapse of an hour from start of dispersion, and so the beads could not be separated. Therefore, The initial viscosity of pigment dispersed liquid 21 could not be measured.

Pigment Dispersed Liquid 22

15 parts by weight of C.I. Pigment Black 7 (carbon black) as a colorant, 3.5 parts by weight of Discole N-518 (manufactured by Dainichiseika Color and Chemicals Mfg. Co., Ltd.) as a dispersant, 0.2 parts by weight of p-methoxyphenol (manufactured by Kanto Chemical Co., Inc.) as a thermopolymerization inhibitor, and lauryl methacrylate as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 22 was obtained. The initial viscosity of pigment dispersed liquid 22 was measured by an MCR-300 manufactured by Physica, and the result was 24.8 (mPa·s).

Pigment Dispersed Liquid 23

15 parts by weight of C.I. Pigment Black 7 (carbon black) as a colorant, 3.5 parts by weight of Discole N-518 (manufactured by Dainichiseika Color and Chemicals Mfg. Co., Ltd.) as a dispersant, 0.2 parts by weight of p-methoxyphenol, and N-vinylformamide as a monomer were added to form 100 parts by weight, and mixed and stirred to make a mixed solution. Dispersion treatment was performed on the mixed solution with zirconia beads (1.5 mm diameter) using a sand mill (manufactured by Yasukawa Seisakusho) for six hours. After that, the zirconia beads were removed by a separator and pigment dispersed liquid 23 was obtained. The initial viscosity of pigment dispersed liquid 23 was measured by an MCR-300 manufactured by Physica, and the result was 12.2 (mPa·s).

2. Preparation of Light Curable Ink Composition (1) Light Curable Ink Compositions 1-24

A light curable ink composition 1 was prepared with the composition shown below, using pigment dispersed liquid 1 prepared as above. APG-200 (manufactured by Shin-Nakamura Chemical Co., Ltd.) as a monomer, Viscoat #360 (manufactured by Osaka Organic Chemical Industry Ltd.), and AG (manufactured by Nippon Nyukazai Co., Ltd.) were used. Also, the additives used were Irgacure 819 and 369 and Darocur EHA (manufactured by Ciba Specialty Chemicals) as photopolymerization initiators and BYK-UV3570 (manufactured by BYK-Chemie Japan) as a surfactant. An ink solvent was prepared by mixing and completely melting them. Next, the pigment dispersed liquid 1 was gradually droppered into the ink solvent, while the pigment dispersed liquid 1 was stirred. After finishing delivering the pigment dispersed liquid 1, the solution was mixed and stirred for an hour at normal temperature. After that, the solution was filtered by using a 5 μm membrane filter, and the desired light curable ink composition 1 was obtained.

| | |
|---|---|
| Pigment dispersed liquid | 20 weight % |
| APG-200 | 20 weight % |
| Viscoat #360 | 15 weight % |
| Irgacure 819 | 4 weight % |
| Irgacure 369 | 1 weight % |
| Darocur EHA | 1 weight % |
| BYK-UV3570 | 0.5 weight % |
| AG | Remainder |

Subsequently, light curable ink compositions 2-24 were prepared in the same way as light curable ink composition 1. The dispersed liquids 9, 14, 15, 21, 22, 29, and 30 were not used as ingredients for a light curable ink composition because the viscosity increased unusually during the dispersion treatment in those dispersed liquids.

3. Evaluation Test (1) Evaluation of Storage Stability

The above prepared pigment dispersed liquids were poured into a shading storage container and heated at 60° C. for five days, and the change in viscosity (Δη) from the initial viscosity after a lapse of five days was measured. The viscosity was measured using an MCR-300 manufactured by Physica. The storage stability of the pigment dispersed liquids was evaluated from the measured values based on the evaluation criteria shown below. Table 1 shows the results.

A: Change in viscosity (Δη) after a lapse of five days is ±0.2 (mPa·s) or less.

B: Change in viscosity (Δη) after a lapse of five days is more than ±0.2 (mPa·s).

TABLE 1

| | Dispersed Liquid | Initial Viscosity (mPa · s) | Viscosity after Test (mPa · s) | Δη (mPa · s) | Evaluation Result |
|---|---|---|---|---|---|
| Example 1 | 1 | 10.1 | 10.2 | 0.1 | A |
| Example 2 | 2 | 6.4 | 6.5 | 0.1 | A |
| Example 3 | 3 | 7.4 | 7.4 | 0.0 | A |
| Example 4 | 4 | 5.9 | 6.0 | 0.1 | A |
| Example 5 | 5 | 8.8 | 9.0 | 0.2 | A |
| Example 6 | 6 | 7.6 | 7.6 | 0.0 | A |
| Example 7 | 7 | 6.2 | 6.2 | 0.0 | A |
| Example 8 | 8 | 7.2 | 7.2 | 0.0 | A |
| Comparative Example 1 | 9 | Gelatinized | (Not Evaluated) | — | — |
| Comparative Example 2 | 10 | 8.8 | 8.9 | 0.1 | A |
| Comparative Example 3 | 11 | 7.6 | 7.6 | 0.0 | A |

TABLE 1-continued

| | Dispersed Liquid | Initial Viscosity (mPa·s) | Viscosity after Test (mPa·s) | Δη (mPa·s) | Evaluation Result |
|---|---|---|---|---|---|
| Comparative Example 4 | 12 | 6.4 | 6.4 | 0.0 | A |
| Comparative Example 5 | 13 | 7.3 | 7.2 | −0.1 | A |
| Comparative Example 6 | 14 | 35.2 | Gelatinized | — | B |
| Comparative Example 7 | 15 | 11.3 | 18.5 | 7.2 | B |
| Example 9 | 16 | 10.1 | 10.2 | 0.1 | A |
| Example 10 | 17 | 6.4 | 6.5 | 0.1 | A |
| Example 11 | 18 | 7.4 | 7.4 | 0.0 | A |
| Example 12 | 19 | 5.9 | 6.0 | 0.1 | A |
| Example 13 | 20 | 11.4 | 11.6 | 0.2 | A |
| Comparative Example 8 | 21 | Gelatinized | (Not Evaluated) | — | — |
| Comparative Example 9 | 22 | 24.8 | Gelatinized | — | B |
| Comparative Example 10 | 23 | 12.2 | 35.7 | 23.5 | B |
| Example 14 | 24 | 8.8 | 9.0 | 0.2 | A |
| Example 15 | 25 | 7.6 | 7.6 | 0.0 | A |
| Example 16 | 26 | 6.2 | 6.2 | 0.0 | A |
| Example 17 | 27 | 7.2 | 7.2 | 0.0 | A |
| Example 18 | 28 | 5.9 | 6.1 | 0.2 | A |
| Comparative Example 11 | 29 | Gelatinized | Not Evaluated | — | — |
| Comparative Example 12 | 30 | 21.6 | Gelatinized | — | B |
| Comparative Example 13 | 31 | 9.0 | 11.8 | 2.8 | B |

(2) Evaluation of Curability

The curability of the light curable ink compositions was evaluated using the following procedure, using, as samples, the above prepared light curable ink compositions droppered onto a glass substrate. An ultraviolet ray radiation apparatus using NICHIA i-LED "NCCU 033," which is a 365 nm peak wavelength ultraviolet light emitting diode, and NICHIA "NCCU 001," which is a 380 nm peak wavelength ultraviolet light emitting diode (both manufactured by Nichia Corporation), was used. The radiation conditions for the ultraviolet ray radiation apparatus were set so that each of the radiation intensities for the 365 nm and 380 nm wavelengths was 20 mW/cm$^2$ per radiated surface, and so the total was 40 mW/cm$^2$. Radiation was performed twice: in one radiation, ultraviolet rays were radiated to the samples for five seconds so that the accumulated light quantity became 200 mJ/cm$^2$ (referred to as "Curability 1," in the table); and in the other radiation, ultraviolet rays were radiated for fifteen seconds so that the accumulated light quantity became 600 mJ/cm$^2$ (referred to as "Curability 2" in the table). The curability of the light curable ink compositions (hereinafter referred to simply as "ink") was evaluated based on the evaluation criteria shown below. Table 2 shows the results with the added amount (weight %) of the thermopolymerization inhibitor.

A: Ink was cured without problems.

B: Problems occurred during curing.

TABLE 2

| | Dispersed liquid | Ink | Added Amount of Thermopolymerization Inhibitor (Weight %) | Curability 1 200 mJ/cm$^2$ | Curability 2 600 mJ/cm$^2$ |
|---|---|---|---|---|---|
| Example 19 | 1 | 1 | 0 | A | A |
| Example 20 | 2 | 2 | 0 | A | A |
| Example 21 | 3 | 3 | 0 | A | A |
| Example 22 | 4 | 4 | 0 | A | A |
| Example 23 | 5 | 5 | 0 | A | A |
| Example 24 | 6 | 6 | 0 | A | A |
| Example 25 | 7 | 7 | 0 | A | A |
| Example 26 | 8 | 8 | 0 | A | A |
| Comparative Example 14 | 10 | 9 | 0.04 | B | A |
| Comparative Example 15 | 11 | 10 | 0.04 | B | A |
| Comparative Example 16 | 12 | 11 | 0.04 | B | A |
| Comparative Example 17 | 13 | 12 | 0.04 | B | A |
| Example 27 | 24 | 13 | 0 | A | A |
| Example 28 | 25 | 14 | 0 | A | A |
| Example 29 | 26 | 15 | 0 | A | A |
| Example 30 | 27 | 16 | 0 | A | A |
| Example 31 | 28 | 17 | 0 | A | A |
| Comparative Example 18 | 31 | 18 | 0.04 | B | A |
| Example 32 | 16 | 19 | 0 | A | A |
| Example 33 | 17 | 20 | 0 | A | A |
| Example 34 | 18 | 21 | 0 | A | A |
| Example 35 | 19 | 22 | 0 | A | A |
| Example 36 | 20 | 23 | 0 | A | A |
| Comparative Example 19 | 23 | 24 | 0.4 | B | A |

In the pigment dispersed liquid and its manufacturing method according to an aspect of the invention, Pigment dispersed liquid can be prepared without causing polymerization of a polymerizable compound (monomer), despite a polymerization inhibitor or an polymerization-inhibiting organic solvent not being used. Accordingly, a high quality light curable ink composition can be obtained without being affected by a polymerization inhibitor. Moreover, since no organic solvent has to be used, organic solvent removal treatment, which has been conventionally necessary, does not have to be performed and both the manufacturing procedure and cost can be reduced.

According to the light curable ink composition according to an aspect of the invention, the pigment dispersed liquid does not contain a substantial amount of a polymerization inhibitor. Accordingly, curing of the light curable ink composition is not inhibited, and an excellent quality image can be formed.

Moreover, since the above described light curable ink composition is used in the recording method and for recorded matter according to an aspect of the invention, curing of the light curable ink composition is not inhibited and an excellent quality image can be formed.

What is claimed is:

1. A method for manufacturing a pigment dispersed liquid for use in forming a light curable composition, the method consisting essentially of the following steps:
    (a) providing a polymerizable compound of N-vinylformamide or ethyleneglycol monoallyletlher;
    (b) preparing a mixture by mixing, a pigment; a polyoxyalkylene polyalkylene amine of formula $(C_2H_4N)$—$(PO)_x(EO)_y$—OH, wherein n, x and y are each at least one; a polymerization inhibitor which is p-methoxyphenol; and the polymerizable compound of N-vinylformamide or ethyleneglycol monoallylether, and
    (c) dispersing the mixture to form the pigment dispersed liquid, wherein the polymerization inhibitor is present in the pigment dispersed liquid in an amount less than 0.01 wt %.

2. The method according to claim 1, wherein the polymerizable compound is ethyleneglycol monoallylether.

3. A light curable composition consisting essentially of the pigment dispersed liquid formed by the method of claim 2, a photopolymerization initiator and another polymerizable compound, wherein the composition is ejectable through nozzles in ink jet printing.

4. The method according to claim 1, wherein when the pigment dispersed liquid is poured into a container and heated at 60° C. for a five day period, a change in viscosity of the pigment dispersed liquid from an initial viscosity at the beginning of the five day period to a final viscosity at the end of the five day period is no more than 0.2 mPa·s.

5. A light curable composition consisting essentially of the pigment dispersed liquid formed by the method of claim 1, a photopolymerization initiator and another polymerizable compound, wherein the composition is ejectable through nozzles in ink jet printing.

6. A light curable composition consisting essentially of the pigment dispersed liquid formed by the method of claim 4, a photopolymerization initiator and another polymerizable compound, wherein the composition is ejectable through nozzles in ink jet printing.

* * * * *